(12) United States Patent
Heise et al.

(10) Patent No.: US 7,742,304 B2
(45) Date of Patent: Jun. 22, 2010

(54) CONTROL DEVICE HOUSING FOR AN ELECTRONIC BRAKE

(75) Inventors: Andreas Heise, Erzhausen (DE);
Michael Jürgens, Wölfersheim (DE);
Jürgen Peter Gilb, Bad Homburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 178 days.

(21) Appl. No.: 11/630,740

(22) PCT Filed: Feb. 24, 2005

(86) PCT No.: PCT/EP2005/050784

§ 371 (c)(1),
(2), (4) Date: Sep. 22, 2008

(87) PCT Pub. No.: WO2006/000470

PCT Pub. Date: Jan. 5, 2006

(65) Prior Publication Data

US 2009/0009970 A1  Jan. 8, 2009

(30) Foreign Application Priority Data

Jun. 24, 2004   (DE) .................. 10 2004 030 644

(51) Int. Cl.
*H05K 7/20*   (2006.01)
(52) U.S. Cl. ............... 361/702; 361/704; 361/707; 361/719; 165/80.3
(58) Field of Classification Search ......... 361/687–690, 361/695, 697, 704, 707, 719, 720; 165/80.3, 165/104.33; 174/16.1, 16.3
See application file for complete search history.

(56) References Cited

U.S. PATENT DOCUMENTS

| 5,138,523 | A |   | 8/1992 | Benck et al. |
| 5,946,192 | A | * | 8/1999 | Ishigami et al. ............. 361/704 |
| 6,180,436 | B1 | * | 1/2001 | Koors et al. ................. 438/117 |
| 6,434,000 | B1 | * | 8/2002 | Pandolfi ................. 361/679.33 |
| 6,621,701 | B2 | * | 9/2003 | Tamba et al. ................ 361/699 |
| 7,050,305 | B2 | * | 5/2006 | Thorum ...................... 361/719 |

(Continued)

FOREIGN PATENT DOCUMENTS

DE          195 18 522 A1    11/1996

(Continued)

OTHER PUBLICATIONS

Patent Abstracts of Japan, vol. 2003, No. 12, Dec. 5, 2003, JP 2003 224 386 A (Toyota Motor Corp), Aug. 8, 2003.

*Primary Examiner*—Boris L Chervinsky
(74) *Attorney, Agent, or Firm*—RatnerPrestia

(57) ABSTRACT

A control device housing for an electronic brake system includes a lid, a housing part closable by the lid, a component support member for electronic components, and a cooling element that is in direct or indirect thermal contact with at least part of the electronic components. The cooling element may be either a planar additional cooling plate or a lid that is at least partly made of metal. The cooling element and the component support member are spaced from each other, and thin heat conductive elements are arranged in the resulting intermediate space between the cooling element and the electronic components that are to be cooled or the component support member. The heat conductive elements are configured flexibly for tolerance compensation and inhere good heat conductivity in addition.

6 Claims, 6 Drawing Sheets

U.S. PATENT DOCUMENTS 7,417,861 B2 * 8/2008 Kikuchi et al. .............. 361/718

FOREIGN PATENT DOCUMENTS

| | | |
|---|---|---|
| DE | 197 43 842 A1 | 4/1999 |
| DE | 100 11 807 A1 | 11/2001 |
| EP | 0 520 047 B1 | 12/1992 |
| WO | WO 89/10286 | 11/1989 |

* cited by examiner

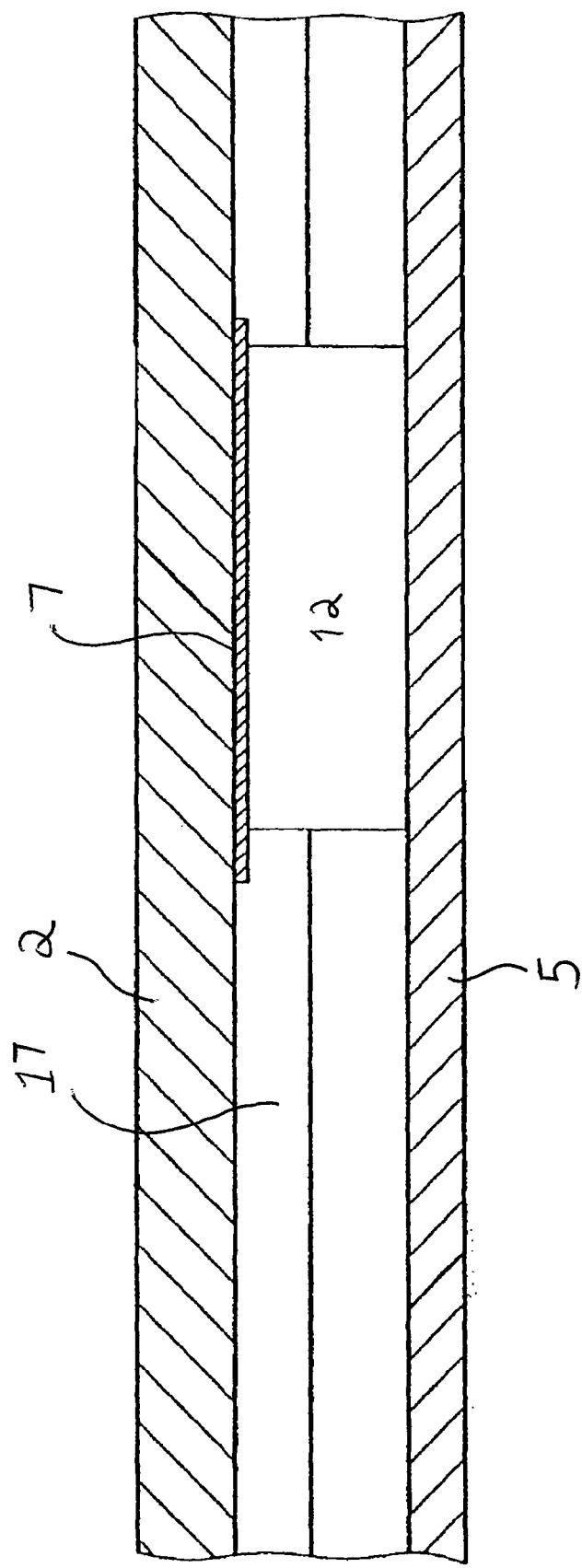

CONTROL DEVICE HOUSING FOR AN ELECTRONIC BRAKE

RELATED APPLICATIONS

This application is the U.S. National Phase Application of PCT International Application No. PCT/EP2005/050784, filed Feb. 24, 2005, which claims priority to German Patent No. DE 10 200.3, filed on Jun. 24, 2004.

TECHNICAL FIELD

The present invention relates to an electronic control device housing for electronic brake systems, in particular in motor vehicles, according to the preamble of claim 1.

BACKGROUND OF THE INVENTION

EP 0 520 047 B1 (P 7129) discloses an ABS control device, which is comprised of movable, elastically retained valve coils in an electronic housing according to the principle of a so-called 'magnetic plug'. The electronic unit (ECU) with integrated printed circuit board and the valve coils connects to a valve block (HCU) in a slip-on manner, which comprises the valve domes and further hydraulic components of the brake aggregate. The ECU further comprises an integrated plug for connection of a connecting cable (e.g. wheel sensor cable). Control devices according to this principle have become generally accepted in the automotive industry and are therefore commonly used for a variety of control tasks (e.g. ABS, ESP, etc.) in motor vehicle brake systems.

As can be seen in DE 197 43 842 A1 (P 9117), it is also known in the art to mount cooling plates made of aluminum into ABS control devices for cooling the electronic components, with these cooling plates being generally connected in flat manner to the carrier plates that carry the electronic components and the conductive tracks. The controller housing, which is made of plastics in many cases, is frequently used as a mounting frame for the valve coils and as an accommodation of the electronic components including the unit composed of cooling plate and printed circuit board. In some cases, the lids of the controller housing are also made of a material with great thermal conductivity and the cooling plates have been moved into thermal contact with said housing already by way of corresponding heat conductive elements.

It has been a general objective to arrange the electronic components contained in the controller housings described in a way that saves mounting space to the best possible, while sufficient cooling of the components must be safeguarded. In addition, these housings must comply with the requirements of modern series production, that means, they must offer ease of manufacture at low cost, and be robust and reliable at the same time. These different requirements cannot always be satisfied easily and simultaneously.

SUMMARY OF THE INVENTION

The invention is based on the special additional object to provide a control device housing with component support member and cooling plate of universal use, and the housing should lend itself to ease of manufacture in a simplest possible and low-cost manner by means of an existing automatic insertion process.

The control device housing according to the invention is primarily used for the accommodation of electronic control assemblies, which are comprised on component support members. By way of electric and hydraulic interfaces, the control device housing and a hydraulic unit can connect to each other in a per se known manner to become an electrohydraulic control unit. The coils for the hydraulic valves are arranged in the control device housing according to the per se known principle of the magnetic plug. When the control device housing and the valve block are joined, the coils are slipped onto domes of the hydraulic valves that project from the block. The electrohydraulic control unit described is favorably employed in electronic motor vehicle brake systems.

It is preferred that the control device housing of the invention is intended for use as an ABS or ESP control unit. However, according to another advantageous embodiment, it is also possible to employ the housing of the invention for electrohydraulic brake systems (EHB). It can be stated in general that the use as a controller housing for an ABS brake system requires fewer cooling provisions for the electronics than when used for an ESP brake system. The control device housing of the invention inheres the advantage that the housing can be adapted in an especially simple manner to a cooling requirement that depends on the type of use. This is achieved according to the invention by arranging the component support member and the cooling element or cooling lid so as to be spaced apart from each other, with several cooling elements being arranged in the intermediate space.

The control device housing, which is provided for an electronic brake system in particular, includes at least one cooling element for cooling the electronic components, and either a planar additional cooling plate or a lid that is made of metal at least in part is appropriate as a cooling element. The bottom side of the planar cooling element is in contact with a flexible heat conductive element or several of the heat conductive elements that compensate tolerances. The bottom side of this or these heat conductive element(s) connects to the electronic component that is to be cooled directly or indirectly, e.g. by way of a heat conducting sheet metal.

The tolerance-compensating, in particular dimensionally stable, flexible or elastic heat conductive element may e.g. consist of a compressible silicone material, or it is a heat conductive cushion, a heat conductive foil, a heat conductive adhesive, a heat conductive paste, a heat conductive gel, or a metallic, slightly compressible spring element. This heat conductive element, which has a planar design in particular, inheres great heat conductivity, that means, it is predominantly made of a metallic material such as copper or aluminum, or it is made of a plastics of great heat conductivity, such as an elastomeric that contains a metal powder. Principally, the heat conductive element may also be so thick that it fills the entire intermediate space between cooling element or lid and printed circuit board or electronic component.

The flexible heat conductive element is favorably provided in large quantities using flat material, e.g. from a wound reel, and is therefore ready-made. It may be suitable to have predefined thicknesses at disposal in order to adapt them to different overall heights or special thermal properties of the electronic components.

An important advantage of the solution of the invention resides in that due to the spaced arrangement of printed circuit board and cooling element or lid, fitment of the component support member is possible from both sides in a preferred fashion. It can be favorable in this respect that the components, which are especially loaded under thermal aspects, are basically arranged on the side facing the cooling element.

The spacer elements are e.g. square-shaped members of a defined height h made of heat conductive plastics or of copper and are fitted to the component support member preferably along with the process of component fitment. Therefore, they are suitably designed without further machining steps. As regards copper elements, it is appropriate for them to be already tin-plated.

The cooling element is preferably made of sheet metal of the type 'Anoxal' or 'Eloxal'. This material has an insulating surface so that, advantageously, the thin, compressible, tolerance-compensating heat conductive elements can be configured to be very thin or electrically conductive. This fact achieves a particularly good thermal contact. Another advantage of the planar cooling element involves achieving a certain shielding against EMC radiation.

Preferably, heat transfer between the two sides of fitment of the component support members is brought about by way of reshaped and riveted cooling caps or cooling rivets. It is furthermore suitable to provide the electrical contacting of the two fitment surfaces by means of through plating. This obviates the need for the sophisticated process of connecting the component support member and the cooling element with a 'prepreg' (i.e. preimpregnated) material, the heat conductivity of the 'prepreg' material being anyway poorer than that of an average heat conducting paste.

Further preferred embodiment can be seen in the claims and the subsequent description of the Figures.

BRIEF DESCRIPTION OF THE DRAWINGS

FIG. 2a) is an enlarged view of the area between the component support member and the cooling element or lid;

DETAILED DESCRIPTION OF THE PREFERRED EMBODIMENT

Figure 1A:
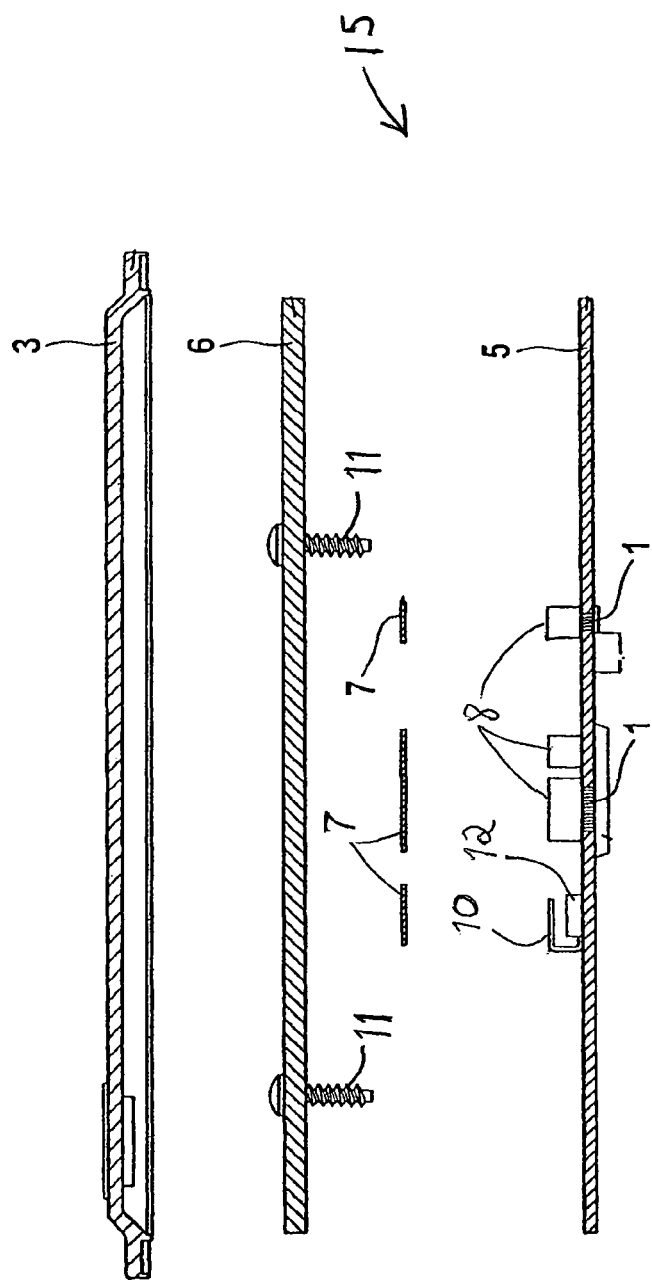
FIG. 1a) is an explosive view of a first embodiment of a control device housing.
Figure 1A:
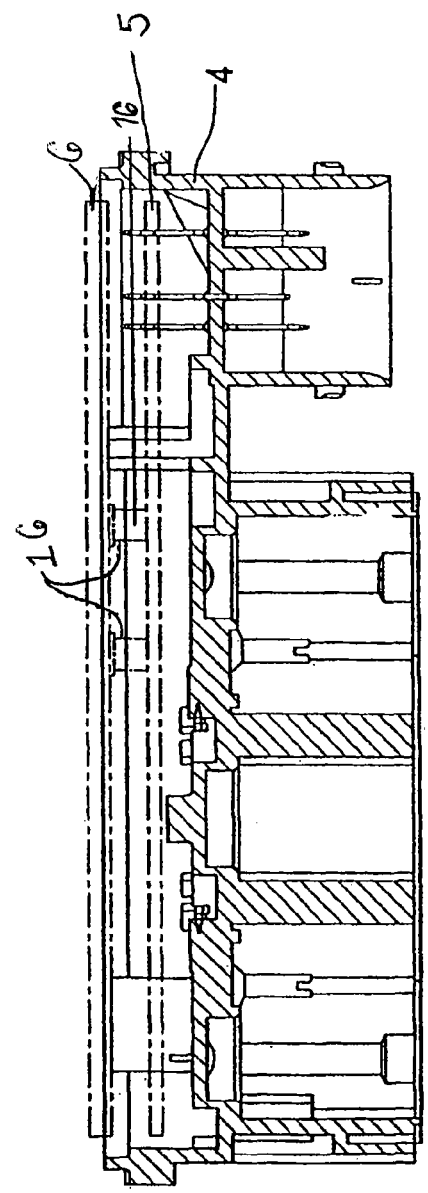

In FIG. 1a, the plastic housing part 4 and the metal or plastic lid 3 constitute the electronic control device housing 15. The attachment of the lid 3 is carried out by a per se known friction-welding process, which achieves a water-tight molecular bond between the lid and the wall of housing part 4. As an alternative, it can be suitable in the case of a metal lid to cement lid 3 together with housing part 4 in a conventional manner. Within the housing, component support member 6, which carries the electronic components 12, is seated on an appropriate abutment on housing part 4. Component support member 6 is fixed by way of press-in contacts 16. Above and slightly spaced from the component support member, cooling plate 6 is seated, which is fastened at the housing frame 4 by means of suitable fastening elements such as screws 11, rivets, or by caulking engagement. In the space between the component support member 5 and the cooling plate 6, the electronic components produce intermediate spaces of different size, which are filled up by means of cooling elements 8 having good heat-conductivity. Cooling elements 8 are suitably cemented onto the component support member 5, or the component support member 5 is equipped jointly with SMD components and soldered subsequently. It is also feasible to equip the thermally critical components 12 with a cooling element 8 on the side of the component support member that faces the lid 3. Thermal contacting of an angled-off cooling fin 10 or a resilient element (not shown), which is in contact with the component 12 that is to be cooled, is also feasible. A suitable arrangement of the cooling elements 8 allows adapting the surface that can be used for heat conduction to the individual requirements in a simple fashion.

Insignificant tolerances that still exist with regard to the overall height h are realized by way of thin, tolerance-compensating, i.e. compressible elastic silicone laminas 7. A per se known compound is used as silicone material, which exhibits a particularly high degree of heat conductivity due to a metal powder component.

Figure 1B:
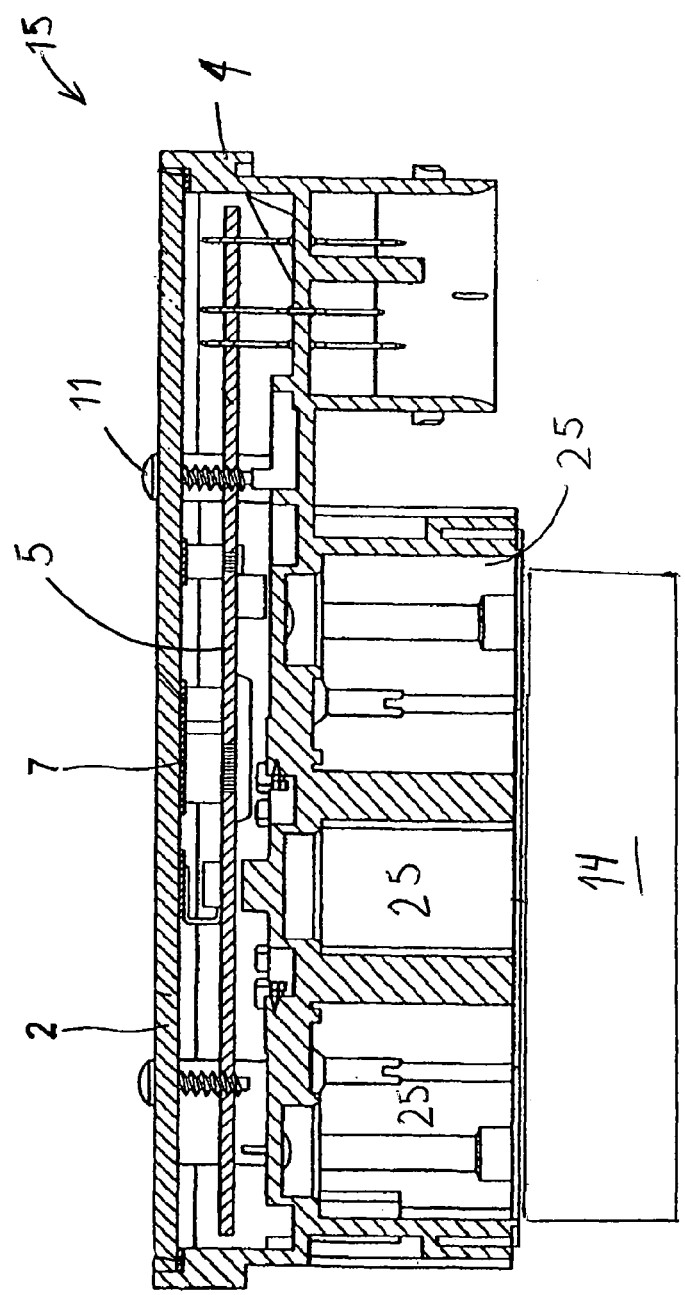
FIG. 1b) shows the control device housing of FIG. 1a) as mounted.

Based on FIG. 1a), FIG. 1b) shows a joined control device housing 15, the difference being that lid 2, which is composed of aluminum or steel, unites in itself the functions of cooling and closing the housing part 4. A certain simplification can be seen in the fact that friction welding like in the variation shown in partial picture a) can be omitted due to the attachment of the lid as illustrated. In addition to the plate shape shown, the lid may also be deepdrawn. Making the lid as a die cast is also feasible. In a preferred manner, the component support member 5 on the side facing the valve block assembly 14 is equipped with electromagnetic coils (not shown) positioned in respective valve coil areas 25 for the hydraulic valves arranged in the valve block assembly 14. The housing part 4 is connected to the valve block assembly 14. The valve block assembly 14 comprises a metallic hydraulic block that contains hydraulic valves. It is advantageous in the present case that, unlike the prior art, the component support member is not connected directly to a heat conducting plate so that a larger fitment surface is achieved on the component support member in the coil contacting area due to the omission of relatively large-surface attachment areas.

FIG. 2a) illustrates the intermediate space 17 between metal lid 2 and component support member 5 in an enlarged view. Component support member 5 is furnished with a heat conductive plastic element 12 to provide a thermal bridge. A thin layer of heat conducting silicon 7 is interposed between plastic element 12 and metal lid 2.

Figure 2B:
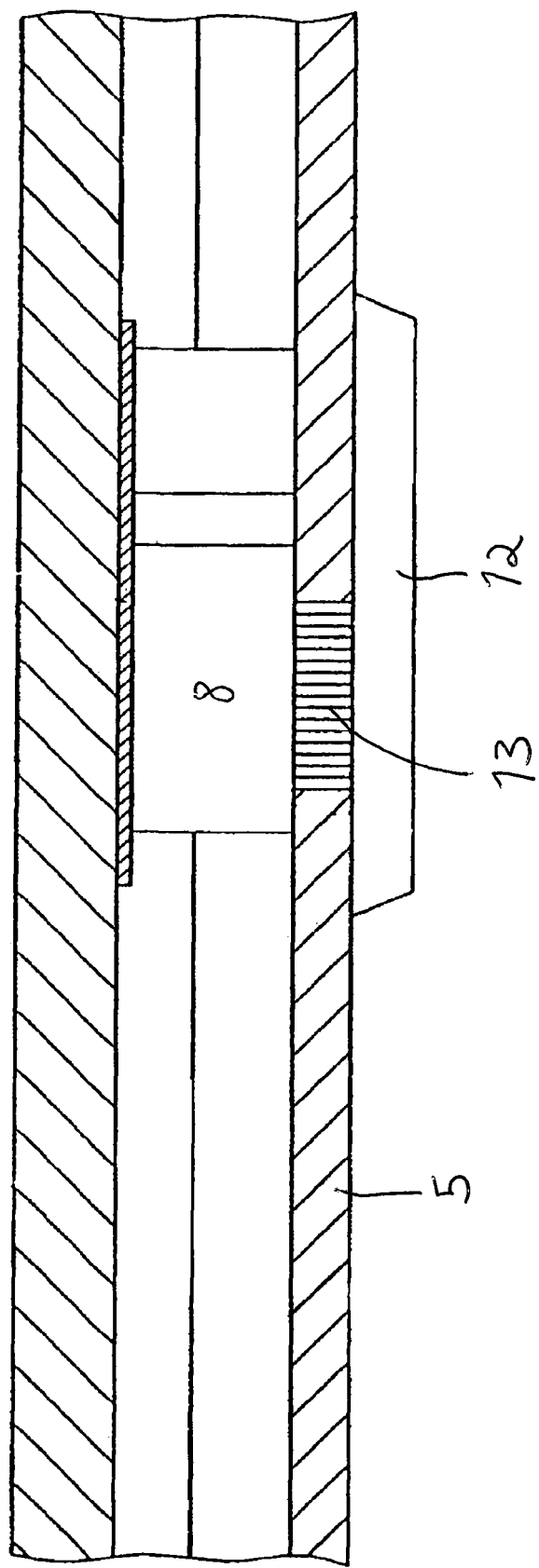
FIG. 2b) is an enlarged view of a segment corresponding to FIG. 2a) with a cooling rivet.

FIG. 2b) largely corresponds to FIG. 2a), while additionally component support member 5 is equipped with the electronic power component 12 on the side close to the valve block. Cooling rivet 13, which is inserted into a bore of the component support member and is soldered or cemented with the electronic component and cooling element 8, constitutes a heat conductive connection to cooling element 8.

Figure 2C:
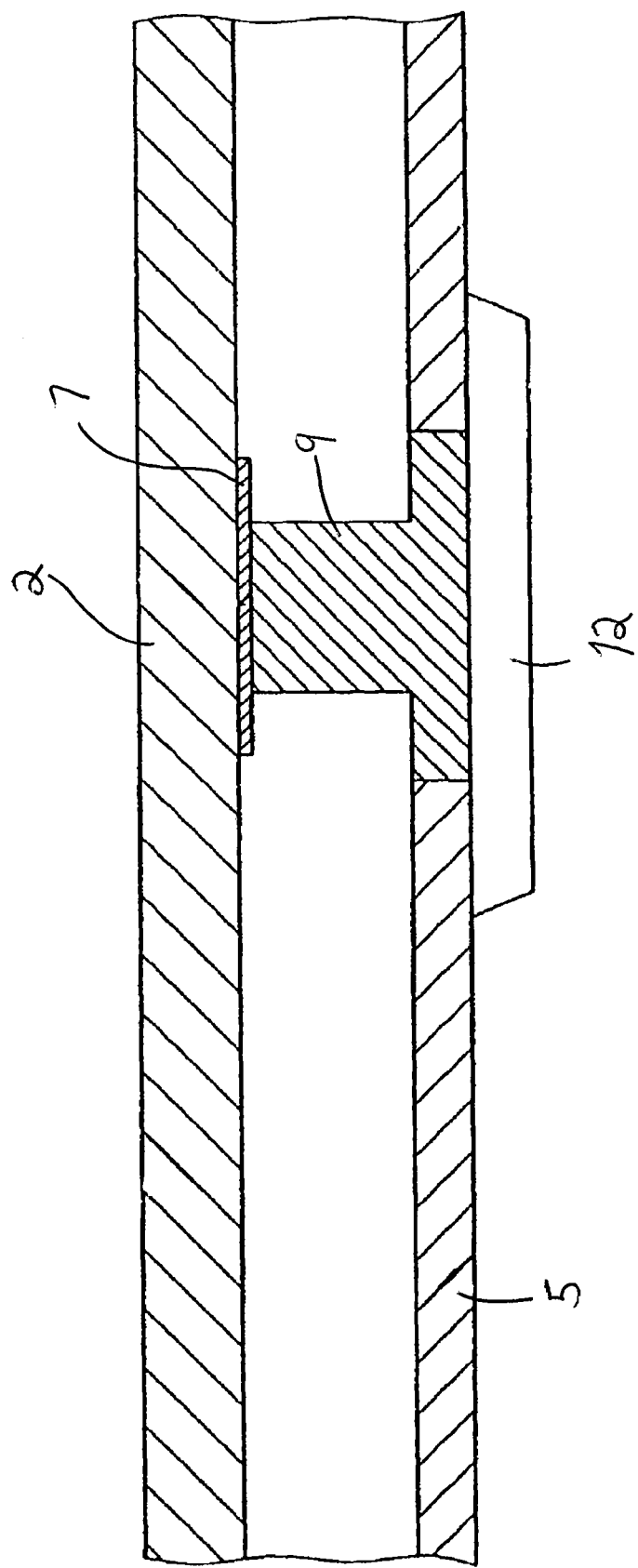
FIG. 2c) is an enlarged view of a segment corresponding to FIG. 2a), wherein the cooling rivet is connected to the heat conductive spacer element.

In the simplified variation according to FIG. 2c), cooling rivet 13 and cooling element 8 are connected to provide an integral spacer element 9 made of a material of good heat conductivity.

Figure 2D:
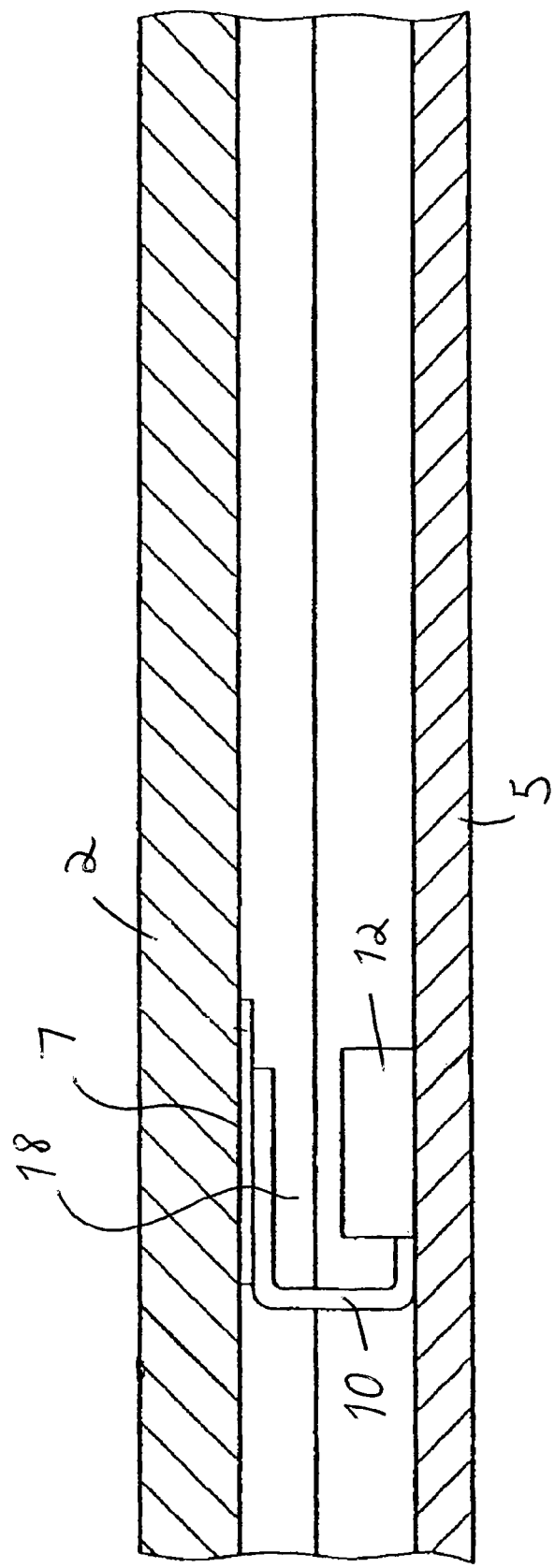
FIG. 2d) is an enlarged view of a segment corresponding to FIG. 2a) with an angled-off sheet-metal strip.

In the variation according to FIG. 2d), component 12 is disposed on the side of the component support member 5 that faces the lid 2. Due to the difference in overall height between component 12 and lid 2, an intermediate space 18 remains between component 12 and lid 2 and is filled with an angled-off sheet-metal strip 10. Sheet-metal strip 10 is also made of a material of good heat conductivity such as metal. It is favorable that sheet-metal strip 10 can be used in addition as a conductive track with a high current carrying capacity.

The invention claimed is:
1. A control device housing for an electronic brake system, comprising:
a lid;
a closable housing part;
a support member for electronic components; and a cooling element in direct or indirect thermal contact with at least a portion of the electronic components, said cooling element being a planar cooling plate or lid at least partly comprised of metal, wherein the cooling element and electronic components are separated from each other by an intermediate space, a plurality of heat conductive elements being arranged in said intermediate space, said heat conductive elements being flexible for tolerance compensation, wherein said closable housing part comprises a valve coil area for accommodating valve coils, wherein the housing part is connected to a metallic hydraulic block assembly that contains hydraulic valves that correspond with valve coils positioned within the valve coil area.

2. The control device housing as claimed in claim 1 wherein the cooling element is attached to the closable housing part or support member by one or more fastening elements, and said heat conductive elements are held in compression by said fastening elements.

3. The control device housing as claimed in claim 1, wherein said electronic components are positioned on either side of said support member.

4. The control device housing as claimed in claim 1 comprising spacer elements between the heat conductive elements and either the electronic components or the support member, the spacer elements being different overall heights so that they provide a plane surface on the side of fitment for the direct or indirect contact with the cooling element and lid.

5. The control device housing as claimed in claim 1 comprising spacer elements between the heat conductive elements and either the electronic components or the support member, wherein the spacer elements are injection-molded parts.

6. The control device housing as claimed in claim 1, wherein the support member contains cooling rivets.

* * * * *